Oct. 8, 1946.  J. EIFEL  2,408,974
PLACE MARKER FOR BOOKS AND THE LIKE
Filed June 1, 1944  2 Sheets-Sheet 1
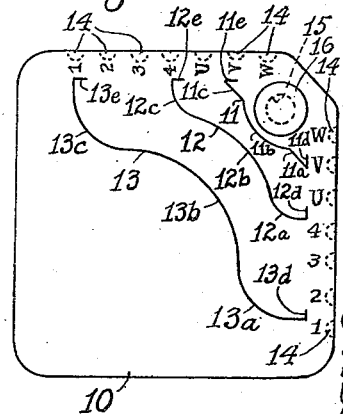
Fig. 1.
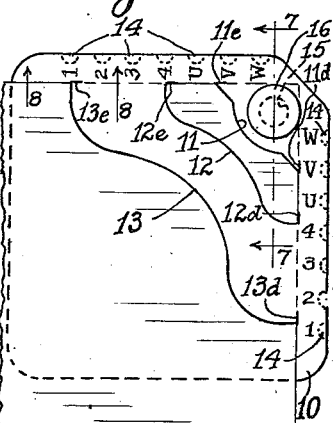
Fig. 2.
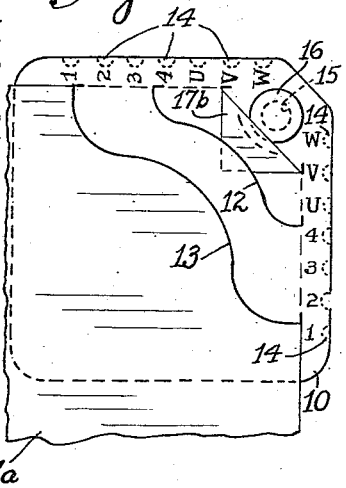
Fig. 3.
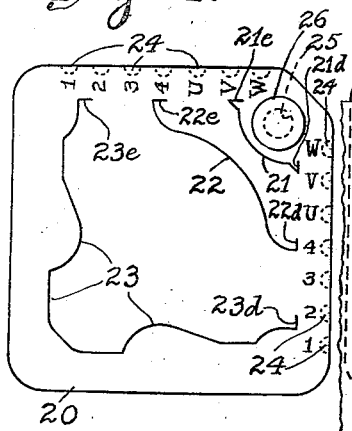
Fig. 4.
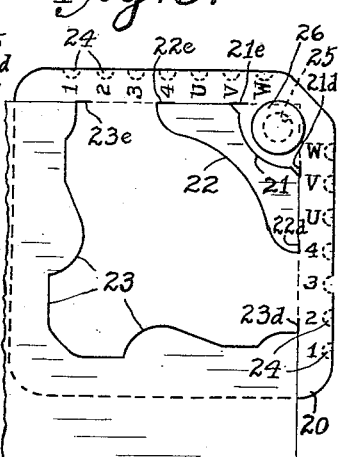
Fig. 5.
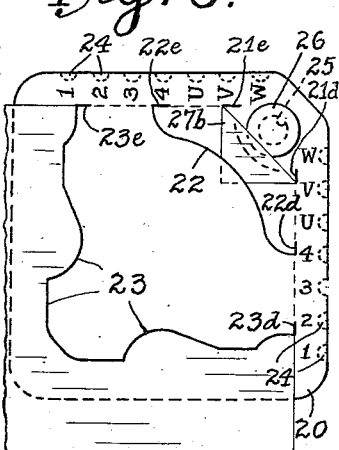
Fig. 6.
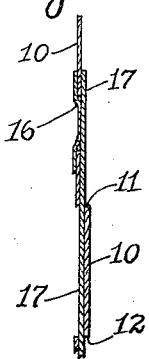
Fig. 7.
Fig. 8.
INVENTOR.
JOSEPH EIFEL
BY Albert E. Bell
ATTORNEY.

Oct. 8, 1946.　　　　　J. EIFEL　　　　　2,408,974
PLACE MARKER FOR BOOKS AND THE LIKE
Filed June 1, 1944　　　2 Sheets-Sheet 2
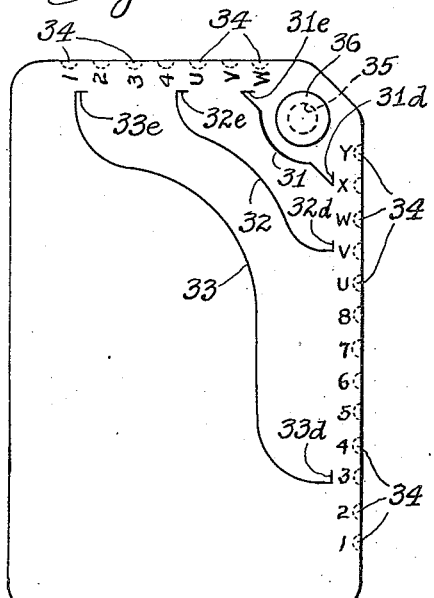
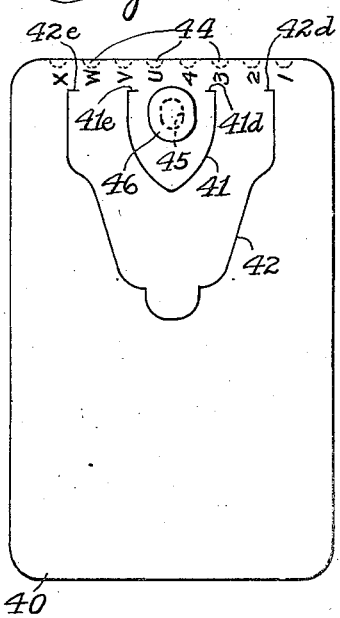
INVENTOR.
JOSEPH EIFEL
BY Albert C. Bell
ATTORNEY Patented Oct. 8, 1946

2,408,974

UNITED STATES PATENT OFFICE 2,408,974

PLACE MARKER FOR BOOKS AND THE LIKE

Joseph Eifel, Chicago, Ill.

Application June 1, 1944, Serial No. 538,251

4 Claims. (Cl. 116—119)

The invention comprises an improved construction of place marker for application to a desired leaf of a book, periodical, magazine or the like, to definitely mark a place in the book or the like that is to be again referred to by a reader, whatever his interest in the reading matter may be. If on the one hand, the reader is searching through various books and the like for scattered items of scientific, literary or other interest, in developing subject matter for a brief, treatise, report or summary of any kind, the place markers of the invention are particularly adapted to the purpose, because of being provided with selective indicia readily usable that will at a glance identify a general part or class and also, if desired, a particular sub-class or specific part of the subject matter being investigated, to which the item or items appearing on the page carrying the place marker, may pertain; on the other hand, if the reader is interested only in marking the page to which he has read as a matter of general reading, the place marker of the invention is well adapted to that purpose.

Whatever may be the application of the invention, the place marker thereof possesses distinctive structural features, giving it marked advantages in use, over book markers and place markers heretofore available, as follows:

*First.*—The place marker consists of a single thickness of resilient sheet material such as paper, fibre, Celluloid or other material adapted to the purpose, in which one or more main slits or cuts are formed, to facilitate passing the corner or edge of a book leaf or other information sheet therethrough in various ways, said main slit or slits being substantially spaced at their ends from the adjacent edge or edges of the place marker;

*Second.*—The main slit or slits through the place marker are preferably connected at their ends with short and preferably right angle extension slits or cuts in the place marker, which remove the shearing tendency of the place marker upon the edge of a book leaf or other information sheet, when the latter is moved in a main slit or slits to the end or ends thereof;

*Third.*—The angle extension slits or cuts adjacent an edge of the place marker are spaced from said edge affording an edge margin of the place marker outside of the margin of the book leaf or other information sheet to which the place marker is applied, for use as below described, and said angle extension slits are preferably placed in alignment with each other and preferably parallel with the edge of the place marker to afford a substantial length of engagement between said angle extension slits and said leaf or sheet edge, thereby avoiding nicking the edge of the leaf or sheet by the ends of said main slits;

*Fourth.*—With the forms of the place marker designed for application to the corner of a book leaf or other information sheet, said main slits extend between the two edges of said corner with the lines of said angle extension slits substantially at right angles to each other to afford said increased engagement of said angle extension slits with each of the corner edges of the book leaf or information sheet;

*Fifth.*—Said main slits are preferably in curved lines of longer length than would be the case if straight slits or cuts were employed, said curved lines preferably including reversed curves, and the curved main slits of the place marker are related to each other in a manner to impart maximum stiffness to the bands or tongues of the place marker between or within said main slits, thereby producing the maximum frictional engagement between the place marker and the book leaf or information sheet to which it is applied, of which the material and surface condition of the place marker are capable;

*Sixth.*—The end portions of said main slits where they connect with said angle extension slits are preferably in directions at right angles to the edge or edges of a book leaf or information sheet engaged thereby, thus permitting most effective resilient response of the bands or tongues of the place marker when it is applied to a book leaf or information sheet, and at the same time most effectively permitting engagement of said angle extension slits with the edge or edges of said book leaf or sheet;

*Seventh.*—A plurality of spaced main slits in the place marker permits applying the same to the corner of a book leaf or information sheet and folding over the corner of said leaf or sheet and interlocking said folded corner with the place marker, thereby establishing a semi-permanent and readily separable connection between the place marker and said leaf or sheet;

*Eighth.*—The place marker is preferably provided with attaching means, for example, a wafer of readily separable adhesive material for engaging a book leaf or other sheet to which the place marker is applied, thereby establishing another form of semi-permanent and readily separable connection between the place marker and said leaf or sheet;

*Ninth.*—The edge margin of the place marker is provided with identifying and preferably semi-detached portions with corresponding identifying letters, figures, colors, and/or other symbols, which comprise classifying or identifying means on a book leaf or information sheet to which the place marker is applied, as to a matter or matters of interest, and, if desired, indexing the matter so marked in any selected system of classification, thereby greatly facilitating research and similar work.

*Tenth.*—The place marker is so inexpensive to make, that it may be freely used in any research or similar work, and discarded to avoid confusion, after one using.

The object of the said invention is to produce a place marker constructed as described, and having the operation and advantages set forth.

The invention will be best understood by reference to the accompanying drawings illustrating preferred embodiments thereof, in which Fig. 1 shows in plan view, one form of the place marker constructed for application to the corner portion of a book leaf or information sheet, Fig. 2 shows the application of the place marker of Fig. 1 to the corner portion of a leaf or sheet, in one manner, Fig. 3 shows the application of the place marker of Fig. 1 to the corner portion of a leaf or sheet, in a second manner, Fig. 4 shows in plan view, a modified form of place marker constructed for application to the corner portion of a book leaf or other information sheet, Fig. 5 shows the application of the place marker of Fig. 4 to the corner portion of a leaf or sheet, in one manner, Fig. 6 shows the application of the place marker of Fig. 4 to the corner portion of a leaf or sheet, in a second manner, Fig. 7 is a sectional view to an enlarged scale of a part of the structure shown in Fig. 2, taken along the line 7—7 in Fig. 2, Fig. 8 is a sectional view to an enlarged scale of a part of the structure shown in Fig. 2, taken along the line 8—8 in Fig. 2.

Fig. 9 shows in plan view a further modified form of place marker constructed for application to the corner portion of a book leaf or other information sheet, and Fig. 10 shows in plan view a form of place marker constructed for application to the straight edge portion of a book leaf or other information sheet.

Similar numerals refer to similar parts throughout the several views.

As shown in Fig. 1, the place marker 10 comprises a single thickness of any suitable resilient material such as paper, fibre, Celluloid or the like, which as shown is substantially square and which may be of a size adapted to the size of the book or other sheet with which the place marker is to be used. The place marker 10 has three main slits or cuts 11, 12 and 13 formed in it, which extend obliquely and nearly across the place marker in the same general direction from near the right hand edge of the place marker to near the top thereof. The main slit 11 includes a straight, short, lower portion 11a, a downwardly curved and longer mid-portion 11b, and a straight, short upper portion 11c in line with the portion 11a. The lower end of the portion 11a connects with a short angle extension slit or cut 11d extending upwardly from the portion 11a and substantially parallel with the right hand edge of the place marker 10. The upper end of the portion 11c connects with a short angle extension slit or cut 11e extending to the right from the portion 11c and substantially parallel with the upper edge of the place marker 10. The portions 11a and 11c are preferably in a line at substantially forty-five degrees inclination to the right hand and top edges of the place marker 10.

The main slit 12 comprises lower and upper downwardly curved portions 12a and 12c connected by an upwardly curved mid-portion 12b. The lower end of the portion 12a connects with a short angle extension slit or cut 12d extending upwardly from the portion 12a and substantially parallel with the right hand edge of the place marker 10 and in line with the angle extension slit 11d. The upper end of the portion 12c connects with a short angle extension slit or cut 12e extending to the right from the portion 12c and substantially parallel with the upper edge of the place marker 10 and in line with the extension slit 11e.

The main slit 13 is of the general shape of the main slit 12 and comprises downwardly curved lower and upper portions 13a and 13c and an upwardly curved mid-portion 13b, the lower end of the portion 13a connecting with a short angle extension slit or cut 13d parallel with the right hand edge of the place marker 10 and in line with the extension slits 11d and 12d, and the upper end of the portion 13c having a short angle extension slit or cut 13e parallel with the upper edge of the place marker 10 and in line with the extension slits 11e and 12e.

It will be noted that as a result of the curved forms of the main slits 12 and 13 above described, the ends of said main slits connecting with the corresponding short angle extension slits are at substantially right angles with the said extension slits respectively connected therewith. This facilitates the resilient yielding of the material of the place marker in the angles between said main slits 12 and 13 and the corresponding extension slits, when the place marker 10 is applied to a corner of a book leaf or other sheet, which protects the edges of the leaf or sheet from the shearing action of the place marker adjacent said main slits, protects the edges of the leaf or sheet from nicking by providing protective abutments having a substantial length of bearing between said extension slits and the edges of the leaf or sheet, and at the same time avoids the danger of tearing the place marker at the ends of the main slits therein.

The place marker 10 is provided in its margins and outside of the said extension slits, with a plurality of identifying or classifying portions 14, preferably having perforated or scored connection with the body portion of the place marker, facilitating the ready removal of any desired one or ones of said portions for indexing or marking purposes as to the printed matter on the leaf or sheet to which the place marker is applied. These indexing portions 14 are marked for identification and classification purposes with any desired numerals, colors, letters and/or symbols, for example as shown in Fig. 1, with numerals 1, 2, 3 etc., and with letters U, V, etc., so that a removed portion 14 will indicate a subject matter or subjects matter to which the place marker is applied, according to any system of identification or classification which may be adopted. If desired, the letters may designate general classes of matter respectively, and the numerals may designate respective sub-classes of matter in said classes, in which case two of said indexing portions 14 may be removed to advantage, one to indicate the class and the other to indicate the sub-class of the matter to which the place marker 10 is applied. The identifying portions 14 may be used in many ways and for many purposes according to the needs and preferances of the user.

It will be noted that the place marker 10 is symmetrical as to its indicating edges, and that it may be applied to the corner of a leaf or sheet to mark and identify the matter on either page of said leaf or sheet as desired. It will also be noted that when the place marker 10 is applied to the corner of a leaf or sheet, the top identifying portions 14 may be used in one system of classification and the side identifying portions 14 may be used in a second and different system of classification, if desired.

The main slits or cuts 11, 12 and 13 made in the place marker 10 as shown and described, by their forms, spacings from each other and relation to each other, provide that the end-attached bands or tongues of the place marker between said main slits shall be relatively flexible at their mid-portions, which facilitates inserting a corner of a leaf or sheet through said main slits, and that the end portions or bases of said bands or tongues shall be relatively stiff and firm, which insures the exertion of substantial pressures by said bands on the opposite sides of a corner of a leaf or sheet inserted through said main slits, and particularly at the edges of said slits and contiguous areas and along the edges of said corner of a leaf or sheet, thereby developing substantial frictional engagement between said corner and the place marker tending to hold the latter in place.

In addition to the frictional holding of the place marker 10 on a corner of a selected leaf or sheet, which may be called a temporary holding of the place marker on said corner, means are provided for effecting a semi-permanent holding of the place marker on the said corner as follows: The corner portion of the place marker 10 is provided with an aperture 15 outside of the main slit 11, covered by a disk 16 of thin sheet material such as paper, fibre or the like, secured to the place marker and having on its side presented to the aperture 15, a wafer or coating of non-drying adhesive, for example, of the nature of that applied to so-called "Scotch tape," the aperture 15 being located so as to be covered by the corner of the leaf or sheet to which the place marker is applied. Thus, when the place marker 10 is applied to a corner of a leaf or sheet 17 as shown in Fig. 2, by placing said corner over the body portion of the place marker and then inserting said corner successively through the main slits 13, 12 and 11 as far as the short angle extension slits will permit, pressing the disk 16 towards said corner will cause said adhesive wafer to adhere to said corner, as indicated in Fig. 7, thereby positively holding the place marker on said corner, until said corner is moved away from the disk 16 to break the adhesion, which may readily be done. If desired, said wafer of adhesive material may be applied to and carried directly by the place marker 10, although the construction including the disk 16 is preferred, because of better protecting the adhesive material on the place marker before the latter is used. In Fig. 2 the identifying portion "2" is removed to indicate the class or sub-class of the matter of the leaf or sheet 17 according to the classification system adopted.

In Fig. 8, the engagement of the edge of the leaf or sheet 17 with the angle extension slit 13e of the main slit 13 is shown, illustrating the length of engagement of the parts.

In connection with the relation of the parts shown in Fig. 8, it will be understood that a similar relation exists along either edge of the leaf or sheet 17 engaged by the place marker 10, at the end of each of the main slits or cuts, 11, 12 and 13 in the marker, excepting that the inclination of the leaf or sheet to the marker in passing through the slit or cut 12, is the reverse of that indicated in Fig. 8, for that edge of the leaf or sheet. The marker thus provides for weaving an edge of a book leaf or other sheet through the main slits or cuts in a marker, with a reversal of the inclination of the leaf or sheet to the marker at each succeeding slit or cut in the marker, and this interwoven condition of said edge of the leaf or sheet at the ends of the said slits or cuts where the holding friction is greatest, results in the marker being held on the leaf or sheet in a substantial manner.

In Fig. 3 the place marker 10 is shown as having semi-permanent attachment to the corner of a leaf or sheet 17a without the use of the adhesive wafer on the disk 16. In this case, the corner of the leaf or sheet is applied over the body portion of the place marker and through the main slit 13, then under the main slit 12 (but not through it), and then up through the main slit 11; then the corner 17b of the leaf or sheet is folded and entered under the band of the place marker between its main slits 12 and 13 and flattened at said fold. This positively holds the place marker on the corner of the leaf or sheet until it is desired to remove the place marker, which is readily done by unfolding the corner of the leaf or sheet. The straight end portions 11a and 11c of the main slit 11 facilitate the folding operation described.

The place marker 20 illustrated in Figs. 4, 5 and 6 is similar in construction and operation to the place marker 10, the main slits or cuts 21 and 22 therein being substantially the same and similarly related to each other, as the main slits or cuts 11 and 12 in the place marker 10. The main slit or cut 23 in the place marker 20 differs from the main slit or cut 13, in that it is more widely spaced from the main slit 22 than is the main slit 13 from the main slit 12, said main slit 23 extending generally near the left hand and bottom edges of the place marker 20 and leaving a maximum of clear space on the band between the main slits 22 and 23 for advertising or other printed matter if desired, at the same time substantially stiffening said band and correspondingly increasing the pressures exerted on the corner of the leaf or sheet to which the place marker may be applied. The main slit 23 includes curved and straight portions related as shown, to form an extending tongue that is relatively flexible to facilitate raising it to insert the corner of the leaf or sheet under it, the curved portions of said main slit serving to impart a substantial length to said slit, with corresponding surface engagement of the corner of the leaf or sheet with the place marker on both sides of said main slit, said slit at the same time smoothly moving along the edges of the corner of the leaf or sheet as it is inserted through said slit, without catching on or damaging said edges. The main slit 23 is provided at its ends with short angle extension slits 23d and 23e in line respectively with the angle extension slits 22d, 21d and 22e, 21e in the manner and for the purpose of the angle extension slits in the place marker 10. The place marker 20 is provided with identifying or classifying portions 24, with a corner aperture 25 and adhesive disk 26 of the construction and for the purposes of the corresponding parts of the place marker 10.

In Fig. 4 the place marker 20 is shown before its use, in Fig. 5 it is shown applied to the corner of a leaf or sheet 27 in the same manner described for the place marker 10 in connection with Fig. 2, and in Fig. 6 it is shown applied to the corner of a leaf or sheet 27a in the same manner described for the place marker 10 in connection with Fig. 3.

In Fig. 9 I illustrate a modified form of place marker 30 for application to the corner of a leaf or sheet to be marked, for use particularly with larger leaves or sheets than those with which the place markers 10 and 20 are intended to be used. The place marker 30 is rectangular and substantially higher than it is wide, and is provided with main slits or cuts 31, 32 and 33 of the same general form and relationship to each other as the main slits or cuts 11, 12 and 13 in the place marker 10, and is provided also with short angle extension slits 31d, 32d, 33d and 31e, 32e, 33e formed at the ends of said main slits 31, 32 and 33 respectively, as and for the same purposes above described. The place marker is provided with identifying or classifying portions 34, with a corner aperture 35, and with an adhesive disk 36 of the construction and for the purposes of the corresponding parts of the place marker 10.

The place marker 30 is applied to the corner of a leaf or sheets to be marked, in the same manner and with the same advantages as described above for the place marker 10. It will be noted that the larger size of the place marker 30 permits more extensive use of the identifying and classifying portions 34 than is possible with the smaller place markers 10 and 20.

In Fig. 10 I illustrate a place marker 40 in accordance with the invention, adapted for application to the edge of a leaf or sheet to be marked instead of to the corner thereof. The place marker 40 is provided with main slits or cuts 41 and 42 having their ends near the same edge of the place marker, the main slit 41 defining a first tongue having a substantial width of base and curved sides converging to a central point, and the main slit 42 extending around and substantially spaced from the main slit 41, and comprising straight and curved portions forming a second tongue having a central rounded entrance portion and smoothly engaging the edge of a leaf or sheet inserted through said slit 42 when the place marker is applied to an edge of the leaf or sheet. The main slits 41 and 42 are so formed and related that the central or entrance portion of the place marker defined by each of said slits, is relatively flexible, providing for the ready entrance of an edge of a leaf or sheet into each of said slits, and that the bases of said tongues are relatively stiff to afford correspondingly substantial frictional engagement between the place marker and the leaf or sheet to which it is applied. The main slits 41 and 42 are connected with short angle extension slits 41d, 41e and 42d, 42e in line with each other as and for the purpose described in connection with the place marker 10, and defining an edge margin having identifying and classifying portions 44, as and for the purposes described in connection with the similar margin portions of the place marker 10.

The place marker 40 is provided with an aperture 45 covered by a disk 46 carrying a wafer of adhesive material for effecting semi-permanent attachment of the place marker to a leaf or sheet to which it may be applied, as above described for the place marker 10.

In carrying out my invention, I find that place markers 10 and 20 that are about two and one-half inches square are well adapted for general use with books of small and medium size, the markers 30 and 40 being correspondingly larger for uses making said larger place markers desirable. The small angle extension slits for place markers made of thin sheet material may be about one-sixteenth of an inch long, and for place markers of thick sheet material they may be correspondingly longer. In any event, said angle extension slits should be only long enough to remove the possibility of shearing and nicking the edge of a book leaf or other sheet, and not so long as to materially decrease the opposite pressures on the leaf or sheet by the portions of the place marker on the opposite sides of the end of a main slit, when the place marker is applied to said leaf or sheet, which decrease in said opposite pressures would materially decrease the friction of engagement between the place marker and the leaf or sheet. It will be understood, however, that the dimensions given are illustrative only, and that any sizes, shapes and proportions may be employed as desired, that will operate in the manner described to secure the advantages of the invention.

In connection with the identifying portions 14, 24, 34 and 44, it will be understood that distinctive colors may be applied to said portions in the margin of any marker, to distinguish said portions from each other and to provide for the ready selection and marking of one or more of said portions when said marker is used, instead of otherwise symbolizing said portions, or said distinctive colors may be employed in conjunction with other symbols, if preferred, for example, letters or numerals, or both. A suggested system of distinctive colors is yellow, yellow-red, red, red-purple, purple, blue-purple, blue, blue-green, green, yellow-green, which, being ten in number, readily adapt themselves to a decimal system of classification, and to cooperation with other decimal systems, for example, the numeral system.

It will be understood that I do not limit myself to the particular structures described, as I may employ equivalents thereof without departing from the scope of the appended claims.

What I claim is:

1. A marker for removable application to an information sheet, comprising a piece of sheet material having a margin portion projecting in use beyond the edge of the information sheet to which it is applied and also having a body portion which in use overlaps said information sheet, said piece of sheet material having a continuous first cut therethrough with the ends of said cut at the said margin portion, said first cut being contained in the body portion of said piece of sheet material and leaving the edges of said sheet material made by said cut in engagement with each other, said first cut at its end portions extending in directions substantially perpendicular to the adjacent margin portion of said piece of sheet material and between its end portions having a change of direction for separating the adjacent edges of said first cut by flexure of said piece of sheet material, said piece of sheet material also having at the ends of said first cut short additional cuts extending from the ends of said first cut and substantially parallel with said margin portion and substantially perpendicular respectively to the end portions of said first cut, whereby maximum gripping effect is exerted by the adjacent edges of said first cut on an engaged information sheet and said short extension cuts afford a stop in applying the piece of sheet material to an information sheet and at the same time prevent damaging said engaged information sheet and prevent tearing of said piece of sheet material at the ends of said first cut.

2. A marker for removable application to an information sheet, comprising a piece of sheet material having a margin portion projecting in use beyond the edge of the information sheet to which it is applied and also having a body portion which in use overlaps said information sheet, said piece of sheet material having a continuous first cut therethrough with the ends of said cut at the said margin portion, said first cut being contained in the body portion of said piece of sheet material and leaving the edges of said sheet material made by said cut in engagement with each other, said first cut at its end portions extending in directions substantially perpendicular to the adjacent margin portion of said piece of sheet material and between its end portions having a change of direction for separating the adjacent edges of said first cut by flexure of said piece of sheet material, said piece of sheet material also having at the ends of said first cut short additional cuts extending from the ends of said first cut and substantially parallel with said margin portion and substantially perpendicular respectively to the end portions of said first cut, whereby maximum gripping effect is exerted by the adjacent edges of said first cut on an engaged information sheet and said short extension cuts afford a stop in applying the piece of sheet material to an information sheet and at the same time prevent damaging said engaged information sheet and prevent tearing of said piece of sheet material at the ends of said first cut, said margin portion including two parts extending in directions substantially perpendicular to each other, and said first cut extending with a curved formation from one to the other of said margin parts, whereby said piece of sheet material is adapted for application to the corner portion of an information sheet.

3. A marker for removable application to an information sheet, comprising a piece of sheet material having a margin portion projecting in use beyond the edge of the information sheet to which it is applied and also having a body portion which in use overlaps said information sheet, said piece of sheet material having a continuous first cut therethrough with the ends of said cut at the said margin portion, said first cut being contained in the body portion of said piece of sheet material and leaving the edges of said sheet material made by said cut in engagement with each other, said first cut at its end portions extending in directions substantially perpendicular to the adjacent margin portion of said piece of sheet material and between its end portions having a change of direction for separating the adjacent edges of said first cut by flexure of said piece of sheet material, said piece of sheet material also having at the ends of said first cut short additional cuts extending from the ends of said first cut and substantially parallel with said margin portion and substantially perpendicular respectively to the end portions of said first cut, whereby maximum gripping effect is exerted by the adjacent edges of said first cut on an engaged information sheet and said short extension cuts afford a stop in applying the piece of sheet material to an information sheet and at the same time prevent damaging said engaged information sheet and prevent tearing of said piece of sheet material at the ends of said first cut, said margin portion extending in a single direction for application to a single edge of an information sheet.

4. A marker for removable application to an information sheet, comprising a piece of sheet material having a margin portion projecting in use beyond the edge of the information sheet to which it is applied and also having a body portion which in use overlaps said information sheet, said piece of sheet material having a plurality of continuous and spaced first cuts therethrough having the same general direction, each of said first cuts having its ends at the said margin portion and being contained in the body portion of said piece of sheet material and leaving the edges of said sheet material made by said cut in engagement with each other, each of said first cuts at its end portions extending in direction substantially perpendicular to the adjacent margin portion of said piece of sheet material and between its end portions having a change of direction for separating the adjacent edges of said cut by flexure of said piece of sheet material, said piece of sheet material also having at the ends of each of said first cuts short additional cuts extending from the ends of the corresponding first cut and substantially parallel with the adjacent margin portion and substantially perpendicular respectively to the end portions of the corresponding first cut, whereby maximum gripping effect is exerted by the adjacent edges of each of said first cuts on an engaged information sheet and said short extension cuts afford a stop in applying the piece of sheet material to an information sheet and at the same time prevent damaging said engaged information sheet and prevent tearing of said piece of sheet material at the ends of each of said first cuts, said margin portion including two parts extending in directions substantially perpendicular to each other and each of said first cuts extending from one to the other of said margin parts, whereby said piece of sheet material is adapted for application to the corner portion of an information sheet, said plurality of first cuts providing for weaving the corner portion of an information sheet through them in interlocking engagement for semi-permanent attachment.

JOSEPH EIFEL.